P. Hutchinson.
Churn.

No. 71489. Patented Nov. 26, 1867.

Witnesses
J. N. Piper
Lausity Miller

Inventor
P. Hutchinson.
by his attorney
R. H. Eddy

United States Patent Office.

PATRICK HUTCHINSON, OF BOSTON, MASSACHUSETTS.

Letters Patent No. 71,489, dated November 26, 1867.

---

IMPROVEMENT IN CHURNS.

---

The Schedule referred to in these Letters Patent and making part of the same.

---

TO ALL PERSONS TO WHOM THESE PRESENTS MAY COME:

Be it known that I, PATRICK HUTCHINSON, late of Chicago, in the State of Illinois, but now of Boston, in the county of Suffolk, and State of Massachusetts, have invented a new and useful or improved Churn, and do hereby declare the same to be fully described in the following specification, and represented in the accompanying drawings, of which—

Figure 1:
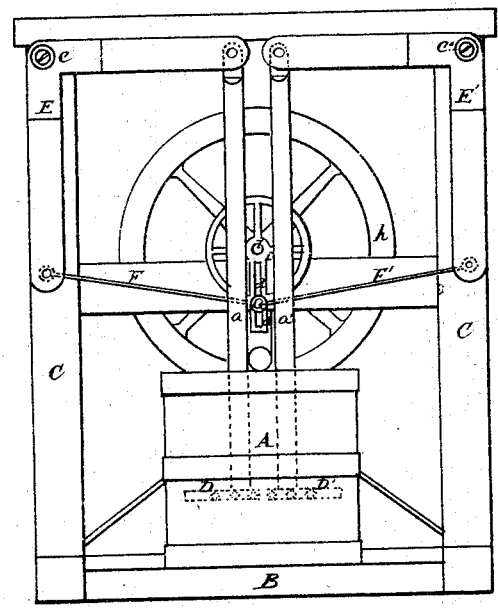

Figure 1 is a front elevation, and

Figure 2:
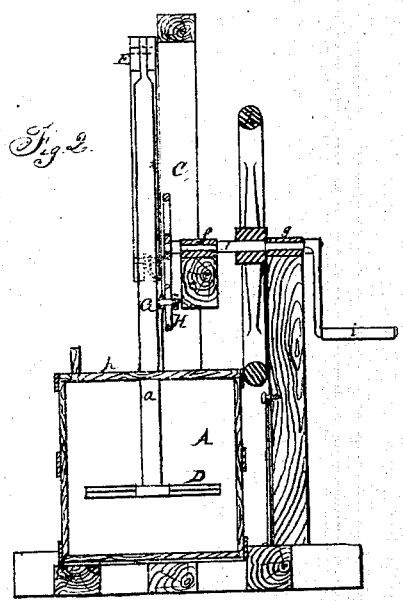

Figure 2 a transverse section of it.

Figure 3:
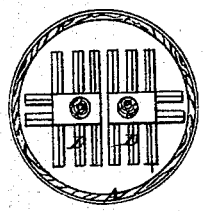

Figure 3 is a horizontal section of the churn-tub, showing the two dashers thereof.

In such drawings, A denotes the said tub or vessel for holding the cream to be churned, it being placed on a platform, B, and within a gallows-frame, C, erected on such platform. Within the churn are two dashers, D D′, whose rods, $a\ a'$, extend up through the cover $b$ of the tub, and at their upper ends are hinged or jointed to the horizontal arms of two right-angular or bent levers, E E′, arranged together, and with respect to the frame C, in manner as represented in the drawings. The fulcra $c\ c'$ of the levers project from the said frame. The pendent arms of the said two levers have two connecting-rods, F F′, jointed to them. These two rods at their inner ends embrace one crank-pin, G, arranged within the slot $d$ of a slotted crank, H, and provided with a clamp-nut and screw, as shown at $e$, by which its position within such slot, or from one to the other end thereof, may be varied, as circumstances may require. The said crank is fixed upon one end of a driving-shaft, I, duly supported in boxes $f\ g$, and provided with a fly-wheel, $h$, and a crank, $i$. By laying hold of the said crank $i$, and revolving it, reciprocating vertical motions will be imparted to each of the dashers within the tub, whereby the churning of cream when in the tub will be speedily and thoroughly effected.

The object of having the crank-pin G adjustable along its crank, and providing it with a clamp-screw and nut, as described, is to enable the degree of vertical movements of the dashers to be varied according to the depth of cream which may be within the tub at any one time. It is very desirable that each of the dashers should always rise entirely out of the cream during each upward movement of such dasher, such being in order that air may be drawn into the cream. After the cream may have been beaten awhile it becomes swelled more or less, or increases in depth in the tub, and were each of the dashers to have one constant amount of movement, it could not be made to rise out of the cream. By having the crank adjustable, as specified, the rise of each dasher may be increased, as occasion may require, from time to time, to cause it to pass out of the cream. The extent of vertical movement of each dasher will depend on the distance of the crank-pin G from the axis of the driving-shaft.

I do not claim two dashers working in a single tub.

What I claim is—

The arrangement and combination of the two bent levers E E′, their connecting-rods F F′, single adjustable crank-pin G, and slotted crank H, together and with the driving-shaft, the two churn-dashers D D′, and the gallows-frame C, the whole being substantially as specified.

PATRICK HUTCHINSON.

Witnesses:
R. H. EDDY,
F. P. HALE, Jr.